Oct. 25, 1966
F. J. TSCHIDA
3,280,497
FISHING LURE
Filed May 7, 1964
3 Sheets-Sheet 2
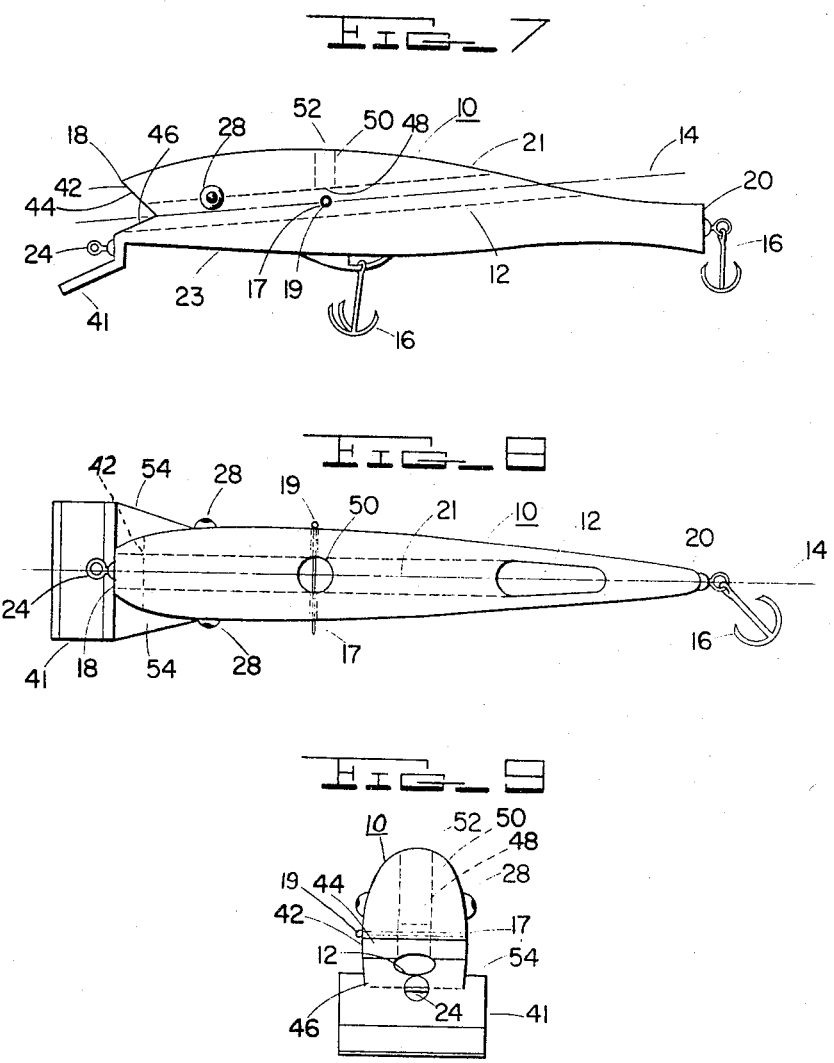
INVENTOR.
FRANK J. TSCHIDA
BY Hood, Gust & Irish
ATTORNEYS Oct. 25, 1966  F. J. TSCHIDA  3,280,497
FISHING LURE
Filed May 7, 1964   3 Sheets-Sheet 3
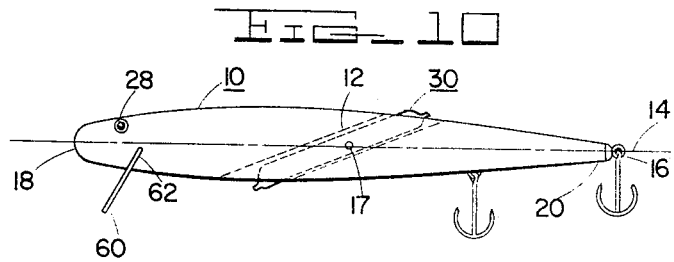
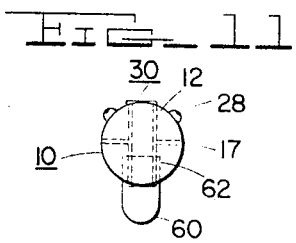
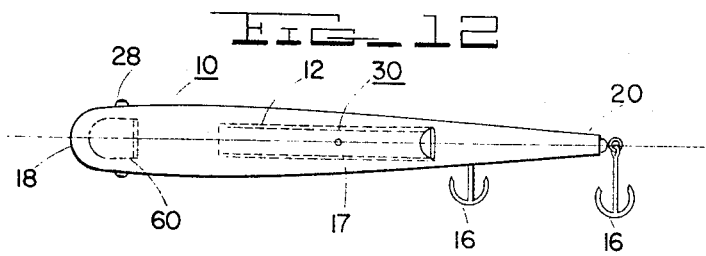
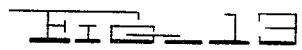 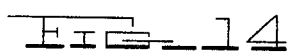
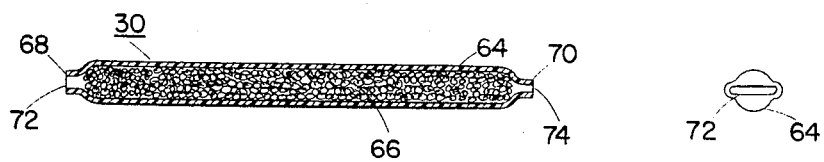
INVENTOR.
FRANK J. TSCHIDA
BY Hood, Gust & Irish
ATTORNEYS

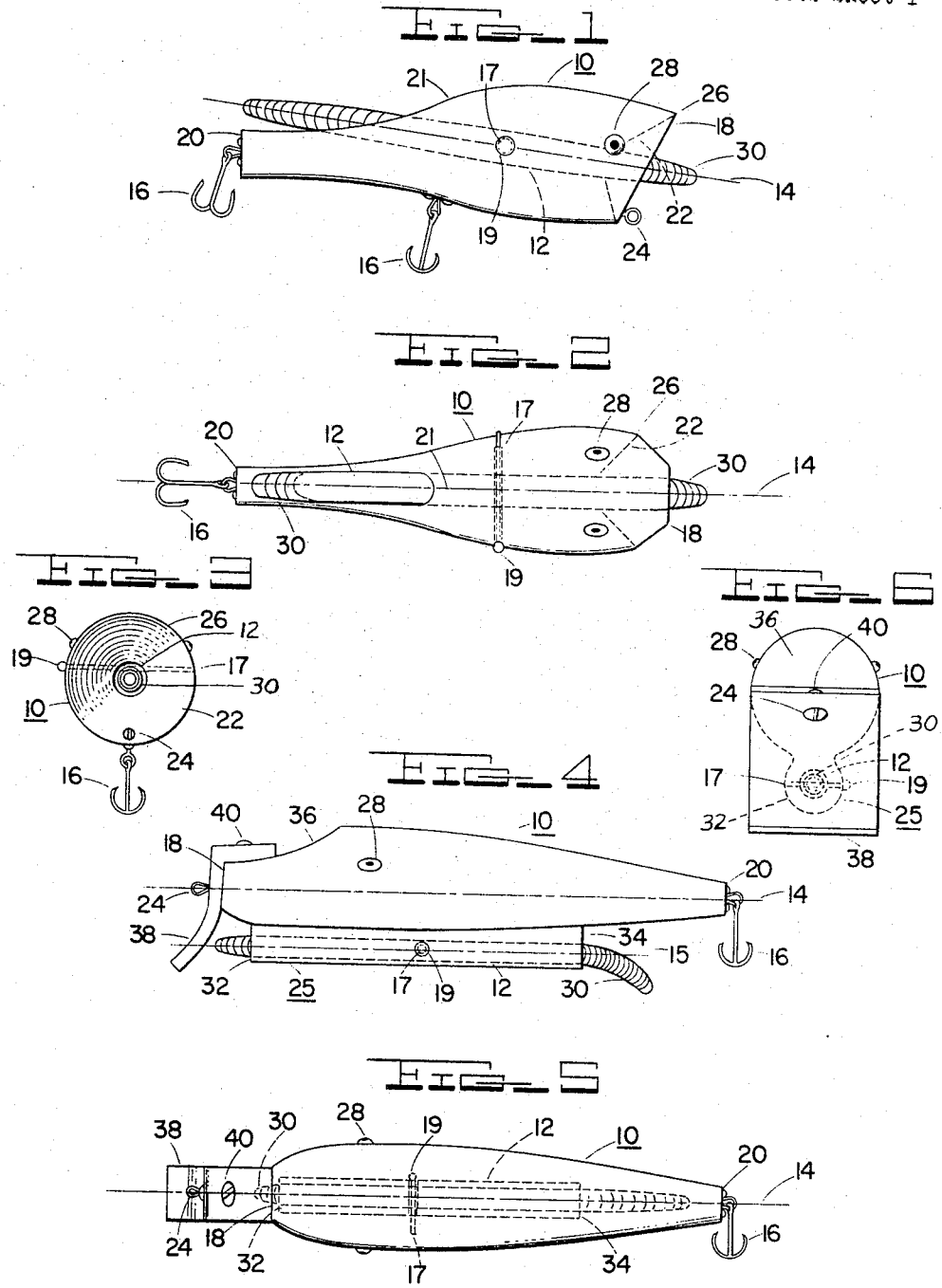

United States Patent Office 3,280,497
Patented Oct. 25, 1966

3,280,497
FISHING LURE
Frank J. Tschida, 841 S. Main St., Kendallville, Ind.
Filed May 7, 1964, Ser. No. 365,604
8 Claims. (Cl. 43—42.06)

This invention relates generally to fishing lures, and more specifically to a versatile fishing lure having a tubular body member which may alternatively be used as an improved live bait holder or a fishing plug.

In the art of fishing, both for sport and commercially, the fisherman constantly endeavors to attract fish by simulating lesser fishes or other live bait which are the constant prey of the larger game fishes. Most skillful fishermen employ a myriad of devices and means for gaining this end; these devices include spoons, plugs, rotary lures, and the like. These devices have their limitations however; and therefore, many fishermen use live minnows, herrings, or other small live animals as bait for certain specific purposes. In every instance the lure or fish is intended to be drawn through the water and to have imparted to its motions or actions resembling the natural swimming or darting action of the lesser fishes for the attraction of the larger fishes. Difficulties are encountered, however, when live bait is used due to the fact that little or no natural action can usually be obtained. Some of this difficulty is due to the bloating or bursting of the bait because of the filling of the visceral cavity with water. Further difficulty is encountered if fish hooks are attached to the live bait as such hooks almost always tear the outer skin and cause deterioration of the bait while it is in the water. While intricate and delicate devices have been proposed for harnessing minnows, herring, and the like, they have been complicated and therefore difficult to attach, especially when the weather is cold and the fishermen's fingers are stiff and cramped. Still further, many of the prior devices are designed so as to utilize the body of the minow or herring as the main portion of the lure. While such a design helps to impart life-like form and movements to the lure, such a lure has the inherent disadvantage that after every catch the body of the fish will almost always be mutilated and have to be replaced. It is therefore desirable to provide a versatile fish lure which has usefulness as a live bait holder, that has aquatic movements resembling live bait, and which protects the bait so as to render the bait reusable.

A fishing plug is similarly intended to be drawn through the water and to have imparted to its motion actions resembling the natural swimming or darting action of a live minnow, herring, or other lesser fish. Amongst fishermen there are various theories and hypotheses as to what makes a successful fishing plug; there is no science, however, of making fishing plugs. Irrespective of whether one believes a fish can smell, see or detect live bait by some extra-sensory means unknown to the human race, experimentation and use have determined that live bait or in some instances a life-like artificial bait, such as an artificial angleworm, if attached to a plug will improve that plug's effectiveness. Experimentation has also shown that the particular and specific movements of a fishing plug as it is drawn through water, with possible reference to the specific type of turbulence created by such movements may also improve a fishing plug's effectiveness. Therefore, it is desirable to provide an improved fishing plug which alternatively can be baited with live or artificial fish bait or can be used unbaited to provide novel aquatic movements which are alluring to game fish.

It is therefore an object of this invention to provide an improved and versatile fishing lure which is highly effective when used with or without the attachment of live or artificial bait.

It is another object of this invention to provide an improved fish bait which can be successfully used with the improved fishing lure of this invention.

It is another object of this invention to provide an improved fish plug which can either be baited or used without bait to produce normal fish-like movements as it is drawn through the water.

Still another object of this invention is to provide an improved fish lure which can be baited sucessfully by an artificial angleworm.

A further object of this invention is to provide an improved baited fish lure which can be used repeatedly without the replacement of bait.

And still further, an object of this invention is to provide an improved fish lure that can be baited easily without difficulty.

Further objects and advantges of the invention will be described and illustrated in the following description and the accompanying drawings, and the features of novelty which characterize this invention will be pointed out with particularly in the claims annexed to and forming a part of this specification.

The invention in its broader aspects provides a fishing lure comprising an elongated body having a passageway formed therein, extending longitudinally and opening adjacent the ends of the body and a cluster of barbed fish hooks attached to the body in strategic positions.

In the drawings:

FIG. 1 is a side view of one embodiment of the improved fishing lure of this invention;

FIG. 2 is a top view of the embodiment of FIG. 1.

FIG. 3 is a front view of the embodiment of FIG. 1;

FIG. 4 is a side view of a second embodiment of the improved fishing lure of this invention;

FIG. 5 is a top view of the embodiment of FIG. 4;

FIG. 6 is a front view of the embodiment of FIG. 4;

FIG. 7 is a side view of a third embodiment of the improved fishing lure of this invention;

FIG. 8 is a top view of the embodiment of FIG. 6;

FIG. 9 is a front view of the embodiment of FIG. 6;

FIG. 10 is a side view of a fourth embodiment of the improved fishing lure of this invention;

FIG. 11 is a front view of the embodiment of this invention shown in FIG. 10;

FIG. 12 is a top view of the embodiment of this invention shown in FIG. 10;

FIG. 13 is a cross-sectional view of one embodiment of the artificial bait that can be used with the improved fishing lure of this invention; and FIG. 14 is a front view of the fish bait of FIG. 13.

Referring now specifically to FIGS. 1, 2 and 3, one embodiment of the improved fishing lure of this invention is shown having a tubular body 10 with an elongated passageway 12, an axis 14, a front end 18 and a rear end 20. Elongated passageway 12 of body 10 is shown to be of a constant diameter coaxially aligned with body 10 about axis 14, and to extend from a position adjacent the front end 18 to a position adjacent the rear end 20 of body 10. Axis 14 is symmetrical to passageway 12 but asymmetrical to body 10. Adjacent rear end 20, passageway 12 terminates in communication with the top exterior surface 21 of body 10; adjacent front end 18 of body 10 passageway 12 terminates in communication with a conical mouth portion 22 which at the other end communicates with front end 18. Body 10 is generally circular in cross-section having a funnel-shaped interior formed by passageway 12 and mouth portion 22. Mouth portion 22 and passageway 12 are inclined from front end 18 to rear end 20. Body 10 has the largest diametered cross-section intermediate front end 18 and the communication of passageway 12 with the exterior surface 21; the smallest diametered cross-section is at rear end 20. A pair of clusters 16 of barbed fish hooks are attached to body 10 at rear end 20 and at a position intermediate ends 18 and 20 to the underside of body 10, respectively in the conventional manner. Clusters 16 intermediate body 10 should be positioned so that body 10 is in balance. Screw eye 24 attached to body 10 at front end 18 adjacent the perimetral edge 26 of funnel-shaped mouth portion 22 is used to draw the lure through the water by means of a fishing line not shown. False eyes 28 are positioned on body 10 so as to give body 10 the appearance of a fish; eyes 28 may be either plastic or glass eyes inserted into body 10 or painted thereon, respectively.

Whenever it is desirable to bait the improved fishing lure of this inventon, bait 30 is placed in passageway 12. In order to secure bait 30 there is provided a relatively small diametered passageway 17 which penetrates passageway 12 at a central location. A pin 19 can then be placed in passageway 17 so as to penetrate the bait and thereby hold the bait within passageway 12. While bait 30 is shown in the drawing to be an angleworm, any type of live bait which can be inserted and held in passageway 12 may be used. For some purposes an artificial angleworm may be used in place of live bait.

Referring now specifically to FIGS. 4, 5 and 6 in which like elements are shown by like reference numerals, there is shown a second embodiment of the improved fishing lure of this invention. Body 10, in this second embodiment of this invention, is solid and has an axis 14, a front end 18 and a rear end 20. A tubular portion 25 is secured to the under side of body 10, having an axis 15 parallel to axis 14, a coaxial elongated passageway 12, and opposite ends 32 and 34. Elongated passageway 12 has a constant diameter and extends from and communicates with ends 32 and 34 which are adjacent front end 18 and rear end 20 of body 10, respectively. Body 10 is generally circular in cross-section; the largest diametered cross-section of body 10 is located intermediate the ends 18 and 20; the smallest diametered cross-section is located adjacent end 20 with an intermediate diametered cross-section adjacent end 18. Between end 18 and the largest diametered cross-section is a substantially flat surface 36 which in cross-section is a chordal boundary removing a segment from an otherwise circular cross-section. Attached at end 18 is a bib 38 which is, in all respects, conventional. Bib 38 is attached to body 10 by a screw 40 with bib 38 contiguous to front end 18 and also to a portion of surface 36. Alternatively, bib 38 may be attached to body 10 by an adhesive or other such means. Bib 38 is of such a size as to extend below passageway 12 at end 32 of the tubular portion 25. Attached to bib 38 is screw eye 24 which is used to draw the fishing lure through the water. Attached in the conventional manner at rear end 20 is a cluster 16 of conventional barbed fish hooks. Additionally, artificial eyes 28 are positioned on body 10 so as to give body 10 a resemblance of a fish; eyes 28 may be either painted on body 10 or be of plastic or glass material and cemented to body 10. Similarly to the first embodiment of this invention, whenever it is desirable to bait the improved fishing lure of this embodiment, bait 30 is placed in passageway 12. In order to secure bait 30 there is provided a relatively small diametered passageway 17 which penetrates passageway 12 at a central location. A pin 19 can then be placed in passageway 17 so as to penetrate the bait and thereby hold the bait within passageway 12. While bait 30 is shown in the drawing to be an angleworm any type of live bait which can be inserted and held in passageway 12 may be used. For some purposes an artificial angleworm may be used in place of live bait.

Referring now specifically to FIGS. 7, 8 and 9, in which like elements are again indicated by like reference numerals a third embodiment of the improved fishing lure of this invention is shown. This fourth embodiment of this invention has a body 10 having an axis 14, a front end 18, a rear end 20 and a coaxial elongated passageway 12 extending from adjacent front end 18 to a position adjacent rear end 20. Axis 14 is symmetrical to passageway 12 but asymmetrical to body 10. Adjacent and communicating with front end 18 is a horizontally disposed V-shaped mouth portion 42. Mouth portion 42 is composed of upper and lower flat surfaces 44, 46, respectively, which communicate with the top and bottom exterior surfaces 21, 23 respectively, of body 10 at end 18. Passageway 12 is of a constant diameter and communicates substantially with the bottom inside flat surface 46 of mouth portion 42 and with the exterior top surface 21 of body 10 at a position adjacent end 20. Bait 30, not shown, may be positioned within passageway 12, similarly to the first and second embodiments, if a baited lure is desired. In order to secure bait 30 there is provided a relatively small diametered passageway 17 which penetrates passageway 12 at a central location. A pin 19 can then be placed in passageway 17 so as to penetrate the bait and thereby hold the bait within passageway 12. Mouth portion 42, and passageway 12 are inclined from front end 18 to rear end 20. Perpendicularly communicating with passageway 12 at one end 48 is a constant diametered passageway 50 which is aligned generally vertical and generally perpendicular to passageway 12. Passageway 50 communicates with the exterior top surface 21 of body 10 at the other end 52 intermediate end 18 and the communication of passageway 12 with surface 21. Bib 41 in this embodiment is shown integrally formed with body 10 and depending from body 10, or more specifically from the lower flat surface 46 of V-shaped mouth portion 42 adjacent front end 18 of body 10. Bib 41 is transversely wider than body 10 and therefore extends to either side of body 10. Communicating with bib 41 and body 10 therebetween, are fillets 54. Attached to the exterior surface of bib 41 is a screw eye 24 which is used to pull the fish lure through the water. Similarly attached are two clusters 16 of barbed fish hooks, one of which is attached to end 20, the other is attached intermediate ends 18 and 20 of body 10. Cluster 16 intermediate body 10 should be positioned so that body 10 is in balance. Artificial eyes 28 are positioned on body 10 similarly to the first and second embodiments of this invention.

Referring now specifically to FIGS. 10, 11 12, in which like elements are again indicated by like reference numerals, a fourth embodiment of the improved fishing lure of this invention is shown. The third embodiment of this rear end 20 and an elongated passageway 12. Passageway 12 has a constant diameter throughout its length and communicates with the exterior of body 10 adjacent ends 18, 20, respectively. Passageway 12 is inclined to the axis 14 from the communication of passageway 12 with the surface of body 10 adjacent front end 18 to the communication of passageway 12 with the surface of body 10 adjacent end 20 forming an acute angle with the axis 14. A bib 60 is frictionally or adhesively secured in a slot 62 which is cut into body 10 intermediate end 18 and the communication of passageway 12 with the surface of body 10 located adjacent end 18. Bib 60 is disposed at an acute angle to axis 14 sloping upwardly in a similar manner to passageway 12. Bib 60 depends from body 10 and extends below the communication of passageway 12 with the exterior of body 10 which is adjacent end 18 thereby providing a baffle which controls the flow of water into and through passageway 12. Artificial eyes 28 are positioned in an appropriate place adjacent front end 18 so as to give body 10 resemblance of a fish; eyes may be either painted on the body 10 or be of plastic or glass material and cemented onto body 10. Similarly to the first three embodiments of this invention, whenever it is desirable to bait the improved fishing lure of this embodiment, bait 30 is placed in passageway 12. In order to secure bait 30 there is provided a relatively small diametered passageway 17 which penetrates passageway 12 at a central location transverse to body 10. A pin 19 (shown only in FIGS. 1 through 9) can then be placed in passageway 17 so as to penetrate the bait and thereby hold the bait within passageway 12. Attached in the conventional manner at rear end 20 and at a position intermediate ends 18, 20, are a pair of conventional barbed fish hook clusters 16, respectively.

While bait 30 can be an angleworm (such as that shown in FIGS. 1 through 6) or any other type of live bait which can be inserted and held in passageway 12, a new kind of artificial bait is shown in the FIGS. 10 through 14. This new artificial bait 30 comprises a tube 64 which is substantially filled with ground up natural bait 66. Ends 68 and 70 are crimped as with a pair of pliers to such a degree that the bait 66 is held within the tube 64 and an opening 72, 74 is left at each of the ends 68, 70, respectively. The tube 64 may be constructed of any standard tube material that will retain its shape after being crimped on the ends; such as metal, plastic, and other such materials. Fish bait 66 can now be a wide variety of materials since practically anything that will attract fish can be held in tube 64. Such materials that have been used successfully include ground beef liver, chopped minnows or salmon eggs, and ground worms, frogs, crickets and other natural foods.

In a specific embodiment of this invention, passageway 12 and passageway 50 are ¼" in diameter, passageway 17 is ⅛" in diameter, body 10 may be composed of wood, plastic, or the like, measuring 4" in length, and fish eyes 28 may be of glass, plastic, or the like material. Clusters 16 of conventional fish hooks are made of any non-corrosive metal material as is screw eye 24.

In operation, all of the embodiments shown operate in somewhat similar fashion. In every instance the lure is intended to be drawn through the water and to have imparted to its motion, actions resembling the natural swimming or darting action of a lesser fish which is a natural food for a larger game fish. Each of the several embodiments of this invention may be used with or without bait being attached. The unbaited lures of this invention most nearly resemble fishing plugs in appearance; however, several differences in structure and operation are easily seen. First, each of the embodiments has an elongated passageway 12 which is longitudinally aligned with body 10. As the fishing lures of this invention are drawn through the water, water is directed into passageway 12 creating a turbulence around front end 18 of the fishing lure. The water which is directed into passageway 12 for the most part exits adjacent end 20; however, some of the water flowing through passageway 12 exits through passageways 17 and 50 which are transverse to body 10 and generally perpendicular to passageway 12. The exiting of the water through these various passageways creates some turbulence around the side of the fishing lures. While no one precisely knows why this added turbulence is attractive to game fish, use of the lures of this invention seen to indicate that such is the case. One thought may be that the turbulence created produces some visibly turbulent water, "white water," around the positions of the tailfins, the side flippers, and in the case of the third embodiment the dorsal fin. Both the first and third embodiments of this invention have means at front end 18 to direct water through passageway 12 which thereby creates an additional amount of turbulence at front end 18. For this very same purpose, bibs 38 and 41 are added to the second and third embodiments, respectively. A secondary purpose for the aforementioned means for directing flow through passageway 12 and the bibs of embodiments two and three are to produce the desired motion of body 10 in the water; such that, body 10 of each embodiment will have aquatic movements similar to the natural swimming or darting movements of the fishes which are the natural feed of the larger game fishes which fishermen desire to catch.

Further, each embodiment of the fishing lure of this invention may be baited thereby to improve its effectiveness for certain specific uses. When an embodiment of this invention is baited, live or artificial bait 30 is inserted into passageway 12 and a pin 19 is pushed into passageway 17 penetrating the bait holding the bait 30 secure in passageway 12. For various purposes, the bait 30 may be angleworms, a small minnow, or a herring fillet, or for some specific purpose an artificial plastic or rubber angleworm, or the like, has sufficed. A very durable, and for some purposes more effective, bait 30 that can be used with each embodiment of the fishing lure of this invention, is the bait 30 shown in FIGS. 13 and 14. This bait as above-mentioned comprises a tube 64 which is filled with ground bait 66. The filled tube 64 is inserted into the fishing lure in the same manner as other bait 30 and can be secured therein by a pin 19 pushed into passageway 17, or more preferably, be secured by the frictional engagement of the tube 64 to the interior of the passageway 12. In operation, as the fishing lure is drawn through the water, water is forced into the tube 64 by means of opening 72 and through tube 64 exiting at opening 74 adjacent the end 20 of the lure. By this means, the water erodes the bait 66 contained within the tube 64 and thereby trails a small and dilute stream of bait behind the lure. By selectively crimping the ends 68, 70 of the tube 64, the rate of erosion can be controlled to fit the particular bait 66 used. Therefore, as can be seen, bait 30 normally closes off the passageway 12 to water flow therethrough; however, when using the artificial bait comprising the tube 64 a small scented stream flows through the passageway 12 and exits adjacent the rear end 20 of the fishing lure.

For many purposes bait 30 is equally effective in the embodiments of the fishing lure of this invention when the bait 30 extends beyond the ends of the passageway 12 or is totally contained within passageway 12. This choice of how the bait 30 can be attached within passageway 12 allows the fisherman to control the replacement of the bait 30 with respect to the effectiveness of the bait 30 when reused; and in addition, allows the third embodiment to be used in a third way. It is common knowledge that some baits 30 deteriorate while in the water to such an extent that they can be used in the water only once or maybe two times. This being the case, the bait 30 can either extend beyond one or both of the ends of passageway 12 thereby adding movements to the lure as it is drawn through the water; or in the alternative, the bait 30 can be used in small pieces and inserted within passageway 12, either way to be discarded after each use. If, however, the bait 30 is highly durable, the fisherman has a choice as to whether to insert the bait 30 completely within passageway 12 thereby having a baited fishing lure that can be used many, many times before the bait 30 must be replaced or to extend the bait 30 from either end of passageway 12 to varying extents which will add movement to the fishing lure as it is drawn through the water but on the other hand will increase the risk of the bait 30 being lost or damaged upon catching a fish. The fisherman has a further choice in using the third embodiment of this invention whether to place bait 30 within passageway 12 between end 18 and the communication of passageways 50 and 12 and thereby allow no water to pass through the body 10 or to place bait 30 intermediate the communication of passageways 50 and 12 and end 20 thereby allowing water to pass into passageway 12 and out passageway 50. This latter modification having an effect of combining the effects of using the third embodiment of this invention with and without bait 30. Judgment as to how to bait the lure, taking into consideration the specific embodiment used, the type of bait used, and the specific use to which the lure is being put is still made by skill and experience acquired over fairly long periods of fishing.

While I have illustrated and described specific embodi-

What is claimed is:

1. A fishing lure comprising an elongated tubular body having substantially circular cross-section, an asymmetrical axis, front and rear ends and first and second tubular interior passageways, said body having the largest of said cross-sections intermediate said front and rear ends and the smallest of said cross-sections at said rear end, said first passageway being adapted to receive bait, said second passageway being smaller than said first passageway, means for directing water flow through said passageways, said means communicating with said front end of said body and said first passageway at one end thereof, said first passageway extending longitudinally of said body and communicating at the other end with the exterior of said body adjacent said rear end, said means and first passageway defining an interior which is inclined in relation to the longitudinal direction of said body, said second passageway extending transversely of said body and said first passageway and communicating with the exterior of said body and said first passageway intermediate said front and rear ends, whereby said flow is split between said first and second passageways, and at least one fish hook secured to said body adjacent said rear end.

2. The fishing lure of claim 1 further comprising fish bait, said bait being inserted into said first passageway, and bait impaling means for retaining said bait in said first passageway.

3. The fishing lure of claim 2 wherein said fish bait protrudes from said passageway adjacent at least one of said front and rear ends.

4. A fishing lure comprising an elongated tubular body having an asymmetrical axis, front and rear ends, and first and second interior passageways, said body having a mouth portion for directing water flow into said first passageway in a longitudinal direction of said body, said mouth portion having an open end and a closed end, said mouth portion having said open end of said mouth portion communicating with the exterior of said body at said front end, said closed end communicating with said first interior passageway, said second passageway extending transversely of said body and said first passageway and communicating with the exterior of said body and said first passageway intermediate said front and rear ends, whereby said water flow is split between said first and second passageways and exits said passageways intermediate said front and rear ends, said first passageway being adapted to receive bait, said second passageway being smaller than said first passageway, a bib integrally formed on said body and depending from said front end of said body, said bib being substantially wider than said body, and at least one fish hook secured to said body adajacent said rear end.

5. The fish lure of claim 4 further comprising fish bait positioned in said first passageway and extending toward said rear end from the communication of said first and second passageways whereby said longitudinal flow is blocked rearward of said second passageway.

6. A fishing lure comprising an elongated tubular body having an asymmetrical axis, front and rear ends, and first and second interior passageways, said body portion having a concavely shaped mouth portion, said mouth portion having an open end and a closed end, said mouth portion communicating with the exterior of said body at said front end, said first passageway being inclined with respect to the longitudinal direction of said body, said first passageway communicating with said closed end of said mouth portion and the exterior of said body adjacent said rear end, said second passageway extending transversely of said body and said first passageway and communicating with the exterior of said body and said first passageway intermediate said front and rear ends, said second passageway being smaller than said first passageway, and at least one fish hook secured to said body adjacent said rear end.

7. The fishing lure of claim 6 further comprising fish bait positioned in said first passageway and means in said second passageway for retaining said bait in said first passageway, and wherein said fish bait protrudes from said first passageway adjacent at least one of said front and rear ends.

8. A fishing lure comprising a substantially solid elongated body having front and rear ends, said body being largest intermediate said front and rear ends and smallest adjacent said rear end, said body having first and second tubular interior passageways extending therethrough, said first passageway being inclined with respect to the longitudinal direction of said body and communicating with the exterior of said body adjacent said front and rear ends, said second passageway extending transversely of said body and said first passageway and communicating with the exterior of said body and said first passageway intermediate said front and rear ends, and at least one fish hook secured to said body adjacent said rear end.

References Cited by the Examiner

UNITED STATES PATENTS

| 923,670 | 6/1909 | Lockhart | 43—42.06 |
|---|---|---|---|
| 2,229,239 | 1/1941 | Davis | 43—42.06 |
| 2,557,577 | 6/1951 | Soma | 43—41 |
| 2,600,437 | 6/1952 | Siepe | 43—42.06 |
| 2,659,995 | 11/1953 | Hagstrom | 43—42.06 |
| 2,703,945 | 3/1955 | Johnson | 43—42.06 |
| 2,766,544 | 10/1956 | Silverthorne | 43—42.06 |
| 2,854,780 | 10/1958 | Dege | 43—42.06 |
| 2,869,279 | 1/1959 | Pretorius | 43—42.06 |
| 3,147,564 | 9/1964 | Messler | 43—42.24 |
| 3,158,952 | 12/1964 | Creme | 43—42.24 |

FOREIGN PATENTS

| 585,291 | 10/1959 | Canada. |
|---|---|---|
| 646,955 | 8/1962 | Canada. |

ABRAHAM G. STONE, *Primary Examiner.*

R. L. HOLLISTER, *Assistant Examiner.*